United States Patent

Gross et al.

Patent Number: 6,051,615
Date of Patent: Apr. 18, 2000

[54] USE OF $C_{16}$-$C_{18}$ ALKYL POLYGLYCOSIDES AS DEFOAMERS IN CLEANING COMPOSITIONS

[75] Inventors: Stephen F. Gross, Souderton, Pa.; John Frederick Hessel, Metuchen, N.J.

[73] Assignee: Henkel Corporation, Gulph Mills, Pa.

[21] Appl. No.: 08/977,419

[22] Filed: Jun. 16, 1997

Related U.S. Application Data

[63] Continuation of application No. 08/457,644, Jun. 1, 1995, abandoned.

[51] Int. Cl.$^7$ .............................. B01D 19/04; B01F 17/56; C11D 3/22
[52] U.S. Cl. ........................... 516/132; 516/204; 536/4.1; 510/470; 510/218; 510/220; 510/234
[58] Field of Search ..................................... 252/321, 358, 252/DIG. 1; 536/4.1; 510/470, 218, 220, 234; 516/132, 204, 917

[56] References Cited

U.S. PATENT DOCUMENTS

| | | | |
|---|---|---|---|
| 5,043,091 | 8/1991 | Joshi et al. | 252/174.17 |
| 5,266,690 | 11/1993 | McCurry, Jr. et al. | 252/174.17 X |
| 5,306,442 | 4/1994 | Hill et al. | 252/321 |
| 5,366,654 | 11/1994 | Van Den Brom et al. | 252/174.17 |
| 5,370,816 | 12/1994 | Balzer et al. | 252/174.17 X |
| 5,449,763 | 9/1995 | Wulff et al. | 536/4.1 X |
| 5,670,471 | 9/1997 | Amalric et al. | 510/416 |
| 5,734,029 | 3/1998 | Wulff et al. | 436/4.1 |
| 5,888,482 | 3/1999 | Amalric et al. | 516/917 |

FOREIGN PATENT DOCUMENTS

| | | |
|---|---|---|
| 2712595 | 5/1995 | France. |
| WO 9307160 | 4/1993 | WIPO. |

OTHER PUBLICATIONS

ASTM, "Standard Test Method for Foaming Properties of Surface–Active Agents" (1986).

*Primary Examiner*—Richard D. Lovering
*Assistant Examiner*—Daniel S. Metzmaier
*Attorney, Agent, or Firm*—John E. Drach; Steven J. Trzaska

[57] ABSTRACT

A process for reducing foam in an alkyl polyglycoside-containing cleaning composition by adding a defoaming-effective amount of an alkyl polyglycoside having the general formula I:

$$R_1O(Z)_a \qquad \qquad I$$

wherein $R_1$ is a monovalent organic radical having from 16 to 18 carbon atoms; Z is a glucose residue having 5 or 6 carbon atoms; a is a number having a value of from 1 to about 6, to a cleaning composition containing an alkyl polyglycoside having the general formula II:

$$R_2O(Z)_a \qquad \qquad II$$

wherein $R_2$ is a monovalent organic radical having from 8 to 16 carbon atoms; Z is a glucose residue having 5 or 6 carbon atoms; a is a number having a value of from 1 to about 6.

20 Claims, No Drawings

USE OF $C_{16}$-$C_{18}$ ALKYL POLYGLYCOSIDES AS DEFOAMERS IN CLEANING COMPOSITIONS

This application is a continuation of application Ser. No. 08/457,644 filed on Jun. 1, 1995, now abandoned.

FIELD OF THE INVENTION

The invention relates to the use of $C_{16}$–$C_{18}$ alkyl polyglycosides to control foaming in $C_8$–$C_{16}$ alkyl polyglycoside containing cleaning compositions.

BACKGROUND OF THE INVENTION

It is known that alkyl polyglycosides exhibit significantly higher foaming profiles than other nonionic surfactants, such as alcohol ethoxylates. In fact, it can be said that the foaming tendencies of alkyl polyglycosides more closely resemble those of anionic surfactants, such as alcohol sulfates, than the foaming tendencies of other nonionic surfactants. This higher foaming tendency makes the use of alkyl polyglycosides undesireable for many applications, e.g. cleaning-in-place for food processing plants, high pressure spray cleaning, bottle washing, floor cleaners and automatic dishwashing, wherein high levels of foam interfere with the cleaning and rinsing operation and reduce the efficiency of the operation.

Low foam nonionics, such as EO/PO block copolymers, can be used to reduce the foaming properties of alkyl polyglycoside surfactants, but these materials have undesireable properties, e.g. low biodegradability, relatively high aquatic toxicity and poor caustic compatability.

Accordingly, there is a need for the development of methods for decreasing the foaming tendency of alkyl polyglycoside containing compositions without simultaneously affecting the beneficial properties of the alkyl polyglycosides, e.g. good cleaning ability, high biodegradability, low aquatic toxicity and good caustic compatability.

SUMMARY OF THE INVENTION

It has now surprisingly been found that by adding an affective amount of a $C_{16}$–$C_{18}$ alkyl polyglucoside to a $C_8$–$C_{16}$ alkyl polyglycoside-containing cleaning composition, a reduction in foaming potential in the cleaning composition is realized without affecting the detersive abilities of the cleaning composition. Accordingly, the present invention relates to a process for reducing foam in an alkyl polyglycoside-containing cleaning composition by adding a defoaming-effective amount of an alkyl polyglycoside having the general formula I:

$$R_1O(Z)_a \qquad\qquad I$$

wherein $R_1$ is a monovalent organic radical having from 16 to 18 carbon atoms; Z is a glucose residue having 5 or 6 carbon atoms; a is a number having a value of from 1 to about 6, to a cleaning composition containing an alkyl polyglycoside having the general formula II:

$$R_2O(Z)_a \qquad\qquad II$$

wherein $R_2$ is a monovalent organic radical having from 8 to 16 carbon atoms; Z is a glucose residue having 5 or 6 carbon atoms; a is a number having a value of from 1 to about 6.

DESCRIPTION OF THE INVENTION

Other than in the operating examples, or where otherwise indicated, all numbers expressing quantities of ingredients or reaction conditions used herein are to be understood as modified in all instances by the term "about".

Alkyl polyglycosides are primarily produced by two methods, i.e., direct synthesis and transacetalization. In the direct synthesis method, glucose is directly reacted with an excess of fatty alcohol in the presence of an acid as catalyst to form the glycoside. In the transacetalization method using a lower alcohol or glycol as solvent and reactant, a lower alkyl glycoside is initially formed and is then reacted with a long carbon-chain fatty alcohol in the following step to form the end product.

It is known that alkyl polyglycosides are both readily biodegradable and non-toxic. However, it is also known that alkyl polyglycosides having $C_8$–$C_{16}$ alkyl chains are foam generators. Thus, while their use in cleaning compositions as nonionic surfactants is desirable for both environmental and detersive reasons, their tendency towards foam production in applications where high foam levels are undesirable, such as in automatic dish washing detergents, floor cleaners, and high pressure spray cleaners, limits their desirability.

Accordingly, the present invention relates to adding a defoaming-effective amount of an alkyl polyglycoside having the general formula I:

$$R_1O(Z)_a \qquad\qquad I$$

wherein $R_1$ is a monovalent organic radical having from 16 to 18 carbon atoms; Z is a glucose residue having 5 or 6 carbon atoms; a is a number having a value of from 1 to about 6, to a cleaning composition containing an alkyl polyglycoside having the general formula II:

$$R_2O(Z)_a \qquad\qquad II$$

wherein $R_2$ is a monovalent organic radical having from 8 to 16 carbon atoms; Z is a glucose residue having 5 or 6 carbon atoms; a is a number having a value from 1 to about 6. The ratio of alkyl polyglycoside of formula I to alkyl polyglycoside of formula II is typically from 10:1 to 1:10.

Cleaning compositions typically contain various surfactants such as nonionic, anionic and amphoteric surfactants, as well as mixtures thereof. Additional components may include builders such as silicates, phosphates, tetrasodium EDTA, and NTA.

Buffer components may also be employed in order to regulate the pH of the cleaning composition. Examples of suitable buffer components include sodium carbonate, triethanolamine, NaOH, and KOH.

Other components typically found in cleaning compositions include corrosion inhibitors, dyes, fragrances, preservatives, and solvents.

The surfactant employed in the cleaning composition of the present process is an alkyl polyglycoside having the general formula II:

$$R_2O(Z)_a \qquad\qquad II$$

wherein $R_2$ is a monovalent organic radical having from 8 to 16 carbon atoms; Z is a glucose residue having 5 or 6 carbon atoms; a is a number having a value from 1 to about 6. Such alkyl polyglycosides are commercially available, for example, as APG®, GLUCOPON®, or PLANTAREN® surfactants from Henkel Corporation, Ambler, Pa., 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. APG® 425 Surfactant—an alkyl polyglycoside in which the alkyl group contains 8 to 16 carbon atoms and having an average degree of polymerization of 1.6.

3. APG® 625 Surfactant—an alkyl polyglycoside in which the alkyl groups contains 12 to 16 carbon atoms and having an average degree of polymerization of 1.6.
4. APG® 325 Surfactant—an alkyl polyglycoside in which the alkyl groups contains 9 to 11 carbon atoms and having an average degree of polymerization of 1.5.
5. GLUCOPON® 600 Surfactant—an alkyl polyglycoside in which the alkyl groups contains 12 to 16 carbon atoms and having an average degree of polymerization of 1.4.
6. PLANTAREN® 2000 Surfactant—a $C_{8-16}$ alkyl polyglycoside in which the alkyl group contains 8 to 16 carbon atoms and having an average degree of polymerization of 1.4.
7. PLANTAREN® 1300 Surfactant—a $C_{12-16}$ alkyl polyglycoside in which the alkyl groups contains 12 to 16 carbon atoms and having an average degree of polymerization of 1.6.

As was noted previously, the use of $C_8$–$C_{16}$ alkyl polyglycosides of formula II as the nonionic surfactant in cleaning compositions is attended by unwanted high levels of foaming. It should be understood that when a carbon atom range is disclosed relating to the alkyl portion of an alkyl polyglycoside, as in the commercially available alkyl polyglycoside disclosed above, that carbon atom range represents a mixture of alkyl groups falling within that range. In order to reduce the level of foam generated by the $C_8$–$C_{16}$ alkyl polyglycosides of formula II present in cleaning compositions, it has been found that by adding an effective amount of a $C_{16}$–$C_{18}$ alkyl polyglycoside having the general formula I:

$$R_1O(Z)_a \qquad \qquad I$$

wherein $R_1$ is a monovalent organic radical having from 16 to 18 carbon atoms; Z is a glucose residue having 5 or 6 carbon atoms; a is a number having a value of from 1 to about 6, the amount of foam generated by the $C_8$–$C_{16}$ alkyl polyglycoside-containing cleaning composition can be affectively reduced.

In one embodiment of the present invention, the cleaning composition employed in the present process contains: from about 0 to 50% by weight of a builder component; from about 1 to 50% by weight of a buffer component; from about 0.1 to 50% by weight of a $C_8$–$C_{16}$ alkyl polyglycoside of formula II; and from about 0.05 to about 25% by weight of a $C_{16}$–$C_{18}$ alkyl polyglycoside of formula I, all weights being based on the weight of the cleaning composition. The ratio by weight of alkyl polyglycoside of formula II to alkyl polyglycoside of formula I is preferably in the range of from 1:10 to 10:1. Preferably, from about 0.05 to about 25%, and particularly from about 3 to about 5% by weight, based on the weight of the cleaning composition, of the $C_{16}$–$C_{18}$ alkyl polyglycoside of formula I is added to the cleaning composition.

In a particularly preferred embodiment of the present invention, the alkyl radical $R_2$ of the alkyl polyglycoside of formula II has a carbon chain length of 8 to 14 carbon atoms and has an amount of alkyl polyglycoside of formula I added to it such that the ratio by weight of alkyl polyglycoside of formula II wherein $R_2$ is a $C_8$–$C_{14}$ alkyl radical to alkyl polyglycoside of formula I is from 1:10 to 10:1, and most preferably 4:1, respectively. It should also be noted that the alkyl polylglycoside of either or both formula I and formula II may also be employed in an alkoxylated form wherein the alkyl polyglycosides of formulas I and/or II contain up to 12 divalent alkylene radicals having from 2 to 4 carbon atoms.

The present invention will be better understood from the examples which follow, all of which are intended to be illustrative only and not meant to unduly limit the scope of the invention. Various blends of alkyl polyglycosides of formula I and II were prepared and tested using the Ross Miles Foam Test (ASTM D1173-53) to determine their defoaming capabilities. The blend compositions and results obtained therefrom are listed in Table I below. Unless otherwise indicated, percentages are on a wt % actives basis.

| Example | wt %\ $C_{16-18}$ | wt % APG ® 225 | Foam Height (mm) |
|---------|-------------------|----------------|------------------|
| 1 | 0 | 100 | 135 |
| 2 | 10 | 90 | 90 |
| 3 | 20 | 80 | 70 |
| 4 | 30 | 70 | 60 |
| 5 | 40 | 60 | 50 |

(a) $C_{16-18}$ is the alkyl polyglycoside of formula I
(b) APG ® 225 is an alkyl polyglycoside in which the alkyl group contains 8 to 10 carbon atoms and having an average degree of polymerization of 1.7, sold by Henkel Corporation, Ambler, PA.

As can be seen from the results in Table 1, the foam produced by blending a $C_{16-18}$ alkyl polyglycoside with an alkyl polyglycoside of formula II is significantly decreased, as compared to the amount of foam produced by an alkyl polyglycoside of formula II by itself.

What is claimed is:

1. A process for reducing foam in an alkyl polyglycoside-containing cleaning composition by adding a defoaming-effective amount of an alkyl polyglycoside having the formula I:

$$R_1O(Z)_a \qquad \qquad I$$

wherein $R_1$ is a mixture of monovalent organic radicals having from 16 to 18 carbon atoms; Z is a glucose residue having 5 or 6 carbon atoms; a is a number having a value of from 1 to about 6, to a cleaning composition containing an alkyl polyglycoside having the formula II:

$$R_2O(Z)_a \qquad \qquad II$$

wherein $R_2$ is a mixture of monovalent organic radicals having from 8 to 16 carbon atoms; Z is a glucose residue having 5 or 6 carbon atoms; a is a number having a value of from 1 to about 6.

2. The process of claim 1 wherein $R_2$ of said alkyl polyglycoside of formula II is a mixture of $C_8$–$C_{14}$ alkyl radicals.

3. The process of claim 1 wherein from about 0.05 to about 25% by weight of said alkyl polyglycoside of formula I is added to said cleaning composition containing from about 0.1 to about 50% by weight of said alkyl polyglycoside of formula II, all weights based on the weight of said cleaning composition.

4. The process of claim 1 wherein said alkyl polyglycoside of formula I and said alkyl polyglycoside of formula II are present in said cleaning composition in a ratio by weight of from 1:10 to 10:1.

5. The process of claim 4 wherein said alkyl polyglycoside of formula I and said alkyl polyglycoside of formula II are present in said cleaning composition in a ratio by weight of about 1:2, respectively.

6. The process of claim 2 wherein said alkyl polyglycoside of formula I and said alkyl polyglycoside of formula II are present in said cleaning composition in a weight percent actives ratio of about 1:4, respectively.

7. The process of claim 2 wherein said alkyl polyglycoside of formula I and said alkyl polyglycoside of formula II are present in said cleaning composition in a ratio by weight of about 1:2, respectively.

8. The process of claim 1 wherein said cleaning composition contains an additive selected from the group consisting of a builder, a buffer, a corrosion inhibitor, a preservative, a dye, a fragrance, a solvent, and mixtures thereof.

9. The process of claim 6 wherein said additive is a builder present in an amount of up to 50% by weight, based on the weight of said cleaning composition.

10. A process of claim 8 wherein said additive is a buffer present in an amount of from about 1 to about 50% by weight, based on the weight of said composition.

11. The product of the process of claim 1.
12. The product of the process of claim 2.
13. The product of the process of claim 3.
14. The product of the process of claim 4.
15. The product of the process of claim 5.
16. The product of the process of claim 6.
17. The product of the process of claim 7.
18. The product of the process of claim 8.
19. The product of the process of claim 9.
20. The product of the process of claim 10.

* * * * *